(12) United States Patent
Gebert et al.

(10) Patent No.: US 8,397,871 B2
(45) Date of Patent: Mar. 19, 2013

(54) BEARING LUBRICATION DEVICE

(75) Inventors: Karl Gebert, Schweinfurt (DE); Helmut Koeberlein, Heustreu (DE)

(73) Assignee: AB SKF, Gothenburg (SE)

( * ) Notice: Subject to any disclaimer, the term of this patent is extended or adjusted under 35 U.S.C. 154(b) by 803 days.

(21) Appl. No.: 11/885,012

(22) PCT Filed: Feb. 17, 2006

(86) PCT No.: PCT/EP2006/001431
§ 371 (c)(1),
(2), (4) Date: Nov. 6, 2009

(87) PCT Pub. No.: WO2006/089687
PCT Pub. Date: Aug. 31, 2006

(65) Prior Publication Data
US 2010/0038175 A1    Feb. 18, 2010

(30) Foreign Application Priority Data
Feb. 26, 2005 (DE) .......................... 10 2005 008 853

(51) Int. Cl.
*B23Q 11/12* (2006.01)
*F16N 11/08* (2006.01)
(52) U.S. Cl. ...................................................... 184/5.1
(58) Field of Classification Search ............... 184/5.1, 184/6.14, 6.16, 6.22, 7.1, 7.4, 67, 104.1; 222/593, 146.2, 146.3, 146.4, 146.5
See application file for complete search history.

(56) References Cited

U.S. PATENT DOCUMENTS

| 2,831,314 | A | * | 4/1958 | Mulholland | 57/120 |
|---|---|---|---|---|---|
| 2,858,175 | A | * | 10/1958 | Sutherland | 384/466 |
| 4,754,848 | A | | 7/1988 | Azzopardi et al. | |
| 4,886,144 | A | * | 12/1989 | Wengeler | 184/45.1 |
| 5,620,060 | A | * | 4/1997 | Bialke | 184/104.1 |
| 6,405,810 | B1 | * | 6/2002 | Grach et al. | 175/52 |
| 6,599,066 | B1 | * | 7/2003 | Koike et al. | 409/135 |
| 6,994,473 | B2 | * | 2/2006 | Nishibata et al. | 384/473 |
| 7,071,834 | B2 | * | 7/2006 | Matsuyama et al. | 340/682 |
| 7,367,429 | B2 | * | 5/2008 | Blecker et al. | 184/7.1 |
| 7,384,197 | B2 | * | 6/2008 | Plona | 384/473 |
| 2003/0133635 | A1 | | 7/2003 | Nishibata et al. | |
| 2006/0239598 | A1 | | 10/2006 | Matsuyama et al. | |

(Continued)

FOREIGN PATENT DOCUMENTS
DE   29 19 486 A1   12/1980
EP   0 297 064 A2   12/1988

(Continued)

OTHER PUBLICATIONS

Form PCT/ISA/210 (International Search Report) dated Jun. 7, 2006.

(Continued)

*Primary Examiner* — Michael Mansen
*Assistant Examiner* — Mark K Buse
(74) *Attorney, Agent, or Firm* — Buchanan, Ingersoll & Rooney PC

(57) ABSTRACT

A device comprises a rotor element which is connected to a stator element by at least one roller bearing, and a grease storage recipient for lubricating the roller bearing. The supply of grease from the grease storage recipient is controlled by a temperature-dependent expansion element.

20 Claims, 3 Drawing Sheets

U.S. PATENT DOCUMENTS

Figure 1:
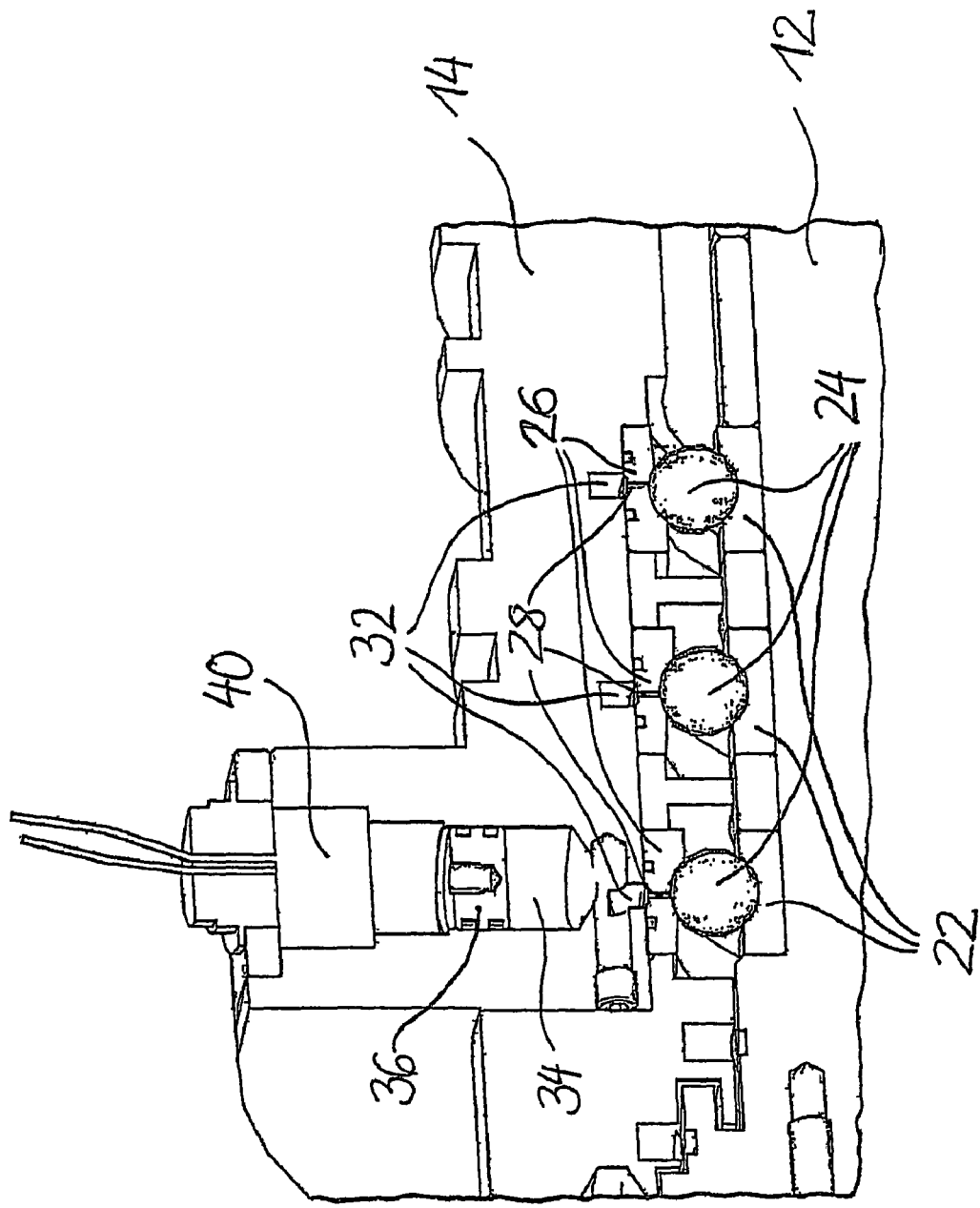

2008/0110700 A1* 5/2008 Yanohara et al. ............... 184/7.4
2010/0038175 A1* 2/2010 Gebert et al. ................ 184/6.14

FOREIGN PATENT DOCUMENTS

| | | |
|---|---|---|
| GB | 1 357 175 | 6/1974 |
| GB | 2 055 154 A | 2/1981 |
| JP | 63-23091 A | 1/1988 |
| JP | 5-231302 A | 9/1993 |
| JP | 2003-49849 A | 2/2003 |
| JP | 2003-83498 A | 3/2003 |
| JP | 2003-232372 A | 8/2003 |
| JP | 2004-340360 A | 12/2004 |
| JP | 2007-536464 A | 12/2007 |
| WO | WO 2005/108849 A2 | 11/2005 |

OTHER PUBLICATIONS

Form PCT/ISA/237 (Written Opinion of the International Search Report) with translation.

International Preliminary Report on Patentability and accompanying translation of the Written Opinion, issued in corresponding International Patent Application No. PCT/EP2006/001431; Sep. 20, 2007; IB of WIPO, Geneva, CH.

Office Action issued Aug. 23, 2011 by the Japanese Patent Office in Japanese Patent Application No. 2007-556538 and English language translation.

* cited by examiner

BEARING LUBRICATION DEVICE

TECHNOLOGICAL FIELD

The invention relates to a device with a rotor part which is designed to rotate, and which is connected via at least one antifriction bearing to a stator part, and with a grease reservoir for lubrication of the antifriction bearing.

BACKGROUND DISCUSSION

For example, JP 2003-049849 A discloses a work spindle of a machine tool in which the spindle shaft is supported via ball bearings in an outside housing. In this connection, in the outside housing there is a grease reservoir for lubricating the ball bearings, the grease reservoir being closed on one side with a movable piston which is moved by compressed air or another pressurized gas for delivery of grease in the direction of the ball bearings.

The object of the invention is to devise an improved device of the initially mentioned type so that among others extremely small amounts of grease can be delivered in an exactly controllable manner from the grease reservoir to the antifriction bearing.

SUMMARY

A device comprises a rotor part which is designed to rotate and which is connected to a stator part via at least one antifriction bearing, and a grease reservoir for lubricating the antifriction bearing, grease delivery from the grease reservoir can be controlled by means of a temperature-dependent expansion element.

The invention is based on the finding that compared to the known mechanisms for delivery of grease from a grease reservoir, especially based on compressed air, even extremely small amounts of grease of less than 1 mm$^3$ can be delivered in an exactly controllable manner with the use of a thermally actuated expansion element. Thus, compared to conventional lubrication systems, for the lubricating system as claimed in the invention it is advantageous that the amount the grease which has reached the raceway region of the antifriction bearing can be exactly dimensioned such that especially after completed relubrication a repeated running-in process need not be carried out. In this connection the device, for example a spindle unit, can advantageously continue to be operated regardless of the current rpm.

Moreover advantageously a high pressure of greater than 5 bar can be produced with the expansion element in order to reliably convey grease even via small holes to the antifriction bearing. Furthermore it is advantageous for the expansion element to be reusable also after refilling of the grease reservoir.

With the lubrication or relubrication system as claimed in the invention, grease lubrication is now opened up for high and extremely high rpm and long duration of grease use. Thus rpm characteristics of up to two million mm per minute and service lives of up to 40,000 hours can be accomplished.

In one advantageous configuration the grease reservoir is integrated as a cavity directly into the device, especially its stator part, and on one end is closed with a piston which can be pressurized for delivery of grease in the direction of the antifriction bearing by the expansion element. In this connection the lubricating grease is pressed via a channel system into the antifriction bearing to be lubricated or into several antifriction bearings to be lubricated.

In one advantageous configuration, other components which belong to the system are integrated completely into the device, for example the spindle unit or the machine system so that damage and outside influences are advantageously precluded.

In one advantageous configuration the lubricating grease is supplied to the antifriction bearing through lubricating holes machined into the outside ring in the immediate vicinity of the raceway. In this way, compared to lubrication from the side, used grease and wear particles are advantageously not conveyed back into the antifriction bearing so that increased wear is prevented and the maximum possible rpm are not limited.

In one advantageous configuration the device is made as the work spindle of a machine tool. In this connection especially the machine tool industry, to increase productivity and reduce production and service costs, requires spindle units with high rpm and long service lives. Furthermore the spindle unit should be made as simple as possible and should not necessitate additional external supply units or connecting lines. High rpm, long service lives, and low operating costs can be achieved with precision bearings, which as necessary are supplied with fresh lubricating grease. In this connection the use of angular ball bearings, cylindrical roller bearings and other precision bearings with lubricating holes through the outside ring in the immediate vicinity of the raceway is a good idea. In other embodiments however bearings with a laterally attached grease inlet are also suited.

Furthermore, grease lubrication relative to comparable oil-air lubrication is relatively simple, economical and highly reliable in use. In oil-air lubrication, particles which are larger than 1 to a maximum 3 μm can be filtered out of the air which is used and the filtered air must be made available under a pressure of at least 5 bar. For oil-air lubrication of a spindle bearing with for example a 70 mm hole, 1.5 m$^3$ air per hour of operation are required. In this connection the average machine tool spindle comprises three to four antifriction bearings. Furthermore the oil of the oil-air lubrication must be filtered such that residual particles larger than 3 to 5 μm in diameter are reliably separated. For this oil-air lubrication, assuming two-shift operation, this yields costs from a few to several thousand euros per year.

Furthermore, in the initial procurement of a device for oil-air lubrication a comparable investment volume can be assumed. Furthermore it is disadvantageous that at least part of the device for oil-air lubrication must be attached so to speak externally on the other side of the actual spindle unit, and that the oil must be supplied via lines with a diameter from 2.6 to 4 mm over partially wide sections to the antifriction bearings, these lines being very sensitive to kinking, pinching or tearing; in case of damage this leads to failure of the spindle unit. Furthermore oil-air lubrication with respect to handling faults and malfunctions which can likewise entail damage to the spindle unit is comparatively sensitive. Finally the available air pressure and the pressure drop in the lines limit the distance within which the individual parts of the device for oil-air lubrication can be located in a disadvantageous manner.

BRIEF DESCRIPTION OF THE DRAWING FIGURES

Other advantages, features and details of the invention will become apparent from the embodiment of the invention described below using the figures.

Figure 2:
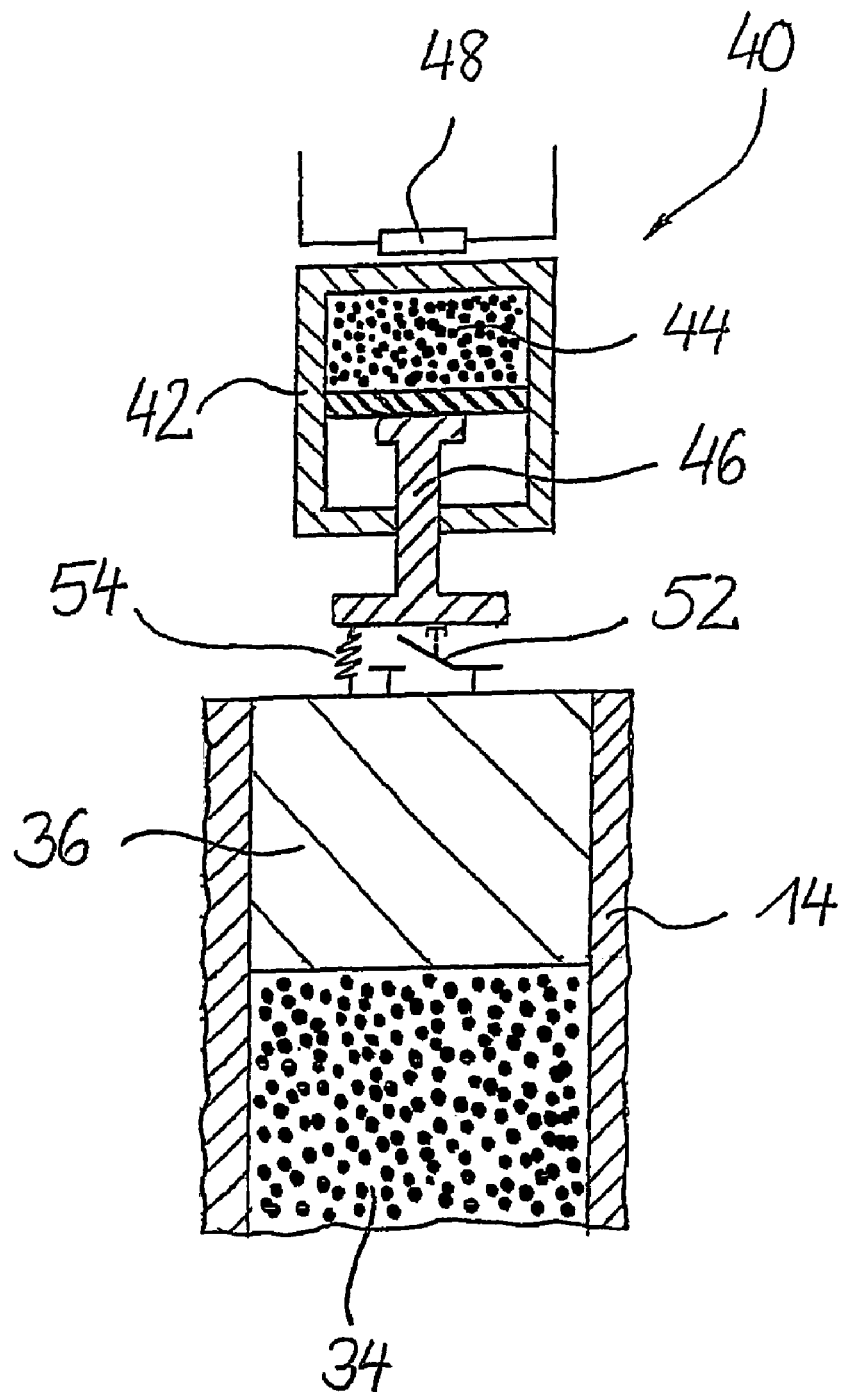
Figure 3:
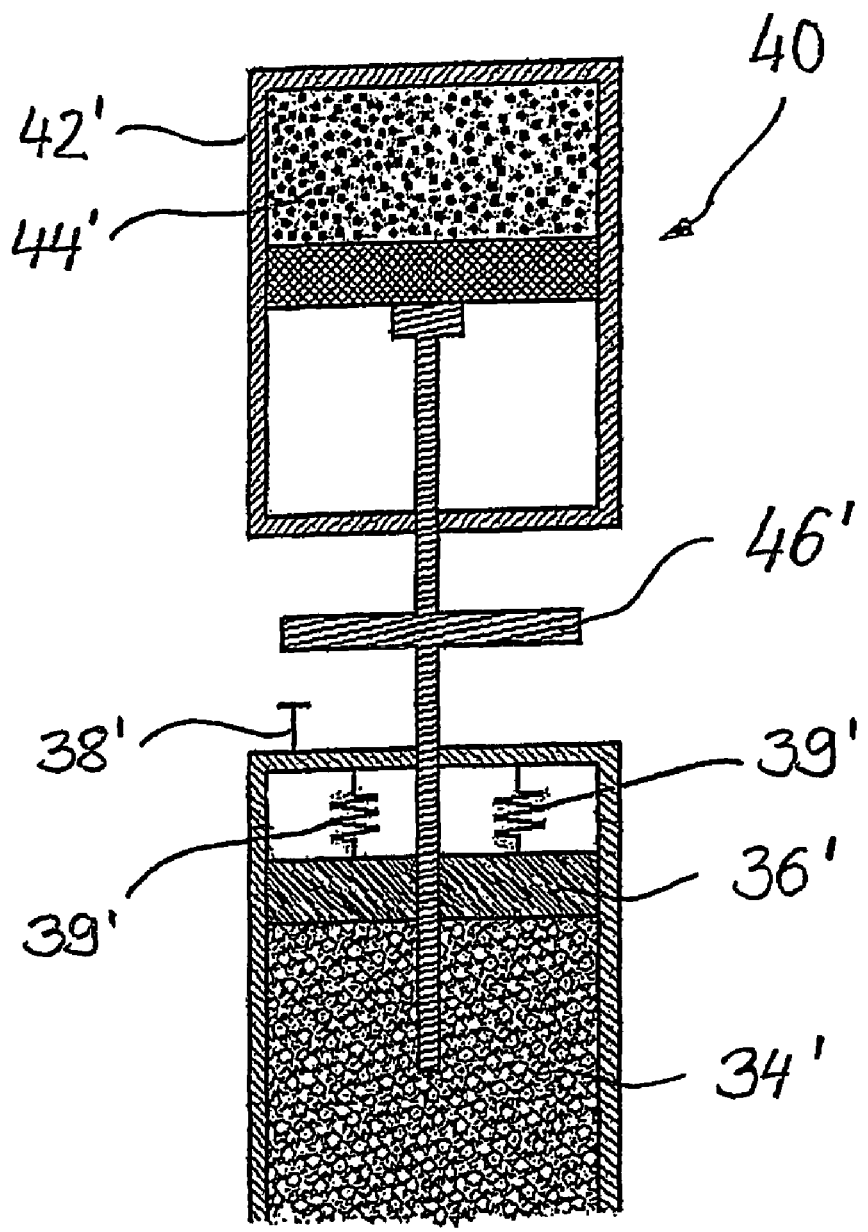

FIG. 1 shows by way of an extract a perspective, partially cut view of a spindle unit with an integrated relubrication system, FIG. 2 shows a schematic of the core of the relubrication system of FIG. 1, and FIG. 3 shows a schematic of important components of another relubrication system.

DETAILED DESCRIPTION

FIG. 1 shows as one embodiment of the invention by way of an extract and in a perspective a lengthwise section through the spindle unit of a machine tool with an integrated relubrication system. The spindle unit comprises a rotor part 12 which is designed for rotation and a stator part 14 which is stationary with respect to the rotor part 12. In this connection the rotor part 12 is pivotally mounted in the stator part 14 via several ball bearings.

Each of the ball bearings comprises an inside ring 22, for example of antifriction bearing steel, roll bodies made as balls 24, for example of a ceramic, and an outside ring 26, for example likewise of antifriction bearing steel. In this connection each of the outside rings 26 of the ball bearings for supply of the ball bearings with lubricating grease has the corresponding lubricating hole 28 via which lubricating grease can be introduced directly in the raceway regions of the ball bearings from the outer jacket of the outside rings 26. In this connection the lubricating holes 28 on the outer jackets of the outside rings 26 of the ball bearings are connected to a channel system 32 which is machined into the stator part 14 and which is connected to the lubricating grease reservoir 34.

In this connection the lubricating grease reservoir 34 is formed by a hole made in the stator part 14. To the outside the lubricating grease reservoir 34 is closed by a piston 36 which can be moved in the direction of the hole. To deliver lubricating grease in the direction of the ball bearing, the piston 36 can be pressed accordingly to the inside. This is effected by a controllable expansion element 40 which is likewise located essentially in the hole; this is detailed below using FIG. 2.

The expansion element 40 comprises a housing 42, a medium 44 which increases the volume under the action of heat, for example a wax, and a plunger 46. These expansion elements are known for example as mass produced articles from heating technology. An electrically actuated heating element 48 is assigned to the expansion element 40. The plunger 46 of the expansion element 40 acts on the piston 36 of the grease reservoir 34, between the plunger 46 and the piston 36 a miniature switch 52 and a weak spring 54 being located.

With activation of the heating element 48 at the start of a relubrication cycle, first the medium 44 is heated, thus expands and presses the plunger 46 out of the housing 42 which in turn presses on the piston 36 of the lubricating grease reservoir 34 and thus lubricating grease is delivered in the direction of the ball bearings. In this connection, at the start of movement of the plunger 46 the miniature switch 52 is activated and the spring 54 is tensioned. With activation of the miniature switch 52 a definable activation time of the heating element 48 is triggered. With interruption of the current supply to the heating element 48 the plunger 46 remains essentially in the position which had last been reached, the spring 54 which is located between the plunger 46 and the piston 36 then being able to relax such that it causes a resetting force for re-releasing the miniature switch 52 at the end of the relubrication cycle.

In another embodiment, with a fixed connection between the plunger and piston and for support of the housing of the expansion element which is made floating in the direction of motion of the plunger and piston, in the stator part the spring and the miniature switch can also be located accordingly between the housing and the stator part.

FIG. 3 shows as another embodiment of the invention a schematic of important elements of another relubrication system. Here the other relubrication system also comprises an expansion element 40', similarly to the expansion element 40 of FIG. 2, with a housing 42', a medium 44' which increases the volume under the action of heat, and a plunger 46'. The plunger 46' is movably routed through a likewise movable piston 36' of a grease reservoir 34' and extends into the lubricating grease reservoir 34' so that by moving the plunger 46', in which the piston 36' is not moved at the same time, lubricating grease can be delivered from the lubricating grease reservoir 34' to the bearing which is to be lubricated.

Differently than in the relubrication system of FIG. 2, the other relubrication system of FIG. 3 is designed for operation such that for each relubrication cycle the plunger 46' is moved a definable distance for delivery of an exactly defined amount of lubricating grease, compared to the relubrication system of FIG. 2 a comparatively large stroke motion of the plunger 46' being used. For this purpose the other relubrication system of FIG. 3 is made such that the plunger 46' is moved at most until it strikes the stop 38' relative to the grease reservoir 34' per relubrication cycle.

Furthermore the geometrical dimensioning especially of the grease reservoir 34' and of the plunger 46' is such that in conjunction with the definable stroke of the plunger 46' per relubrication cycle an exactly metered amount of lubricating grease is delivered. Compared to the relubrication system of FIG. 2, in the other relubrication system of FIG. 3 it is decisive that the delivered amount of lubricating grease per relubrication cycle is thus not dependent on a definable time interval, but is mechanically fixed, with which the dependency of the relubrication process on time is advantageously eliminated compared to the relubrication system of FIG. 2.

The grease reservoir 34' can be closed slightly pretensioned via the piston 36' and the springs 39' such that a cavity which forms after delivery of grease by a corresponding motion of the plunger 46' and subsequent return motion of the plunger 46' is again eliminated and otherwise there is no delivery of grease via the unit of the piston 36' and springs 39'. In this connection the corresponding retraction of the plunger 46' at the end of the relubrication cycle can be achieved by a correspondingly made expansion element 40', but also by a correspondingly arranged spring element. For a more and more exactly identical amount of lubricating grease delivery, in one embodiment the stop 38' can be made to be adaptable to the respective position of the piston 36'.

In another embodiment of the other relubrication system of FIG. 3, there can be other mechanical elements, for example check valves, such that reliable lubricating grease flow is ensured exclusively in the direction of the bearing.

In again other embodiments of course also for the other relubrication system of FIG. 3 similarly to the one in FIG. 2 there can be a miniature switch and a spring between the plunger 46' and the housing of the grease reservoir 34'.

The above described relubrication systems advantageously make it possible to deliver even extremely small, exactly definable amounts of lubricants to the ball bearings at any instant. In this way supply is possible regardless of the operating conditions such as running time, temperature, rpm, vibration level, etc. with the exactly required amount of lubricant. The evaluation and/or control of the signals which are required or which occur in this connection can take place in a higher level control or can be integrated directly into the relubrication unit.

The invention claimed is:

1. Device comprising:
 a rotor part configured to rotate and connected via at least one antifriction bearing to a stator part;
 a grease reservoir containing grease for lubrication of the antifriction bearing;
 an expansion element comprised of a housing with an opening through which extends a portion of a plunger, and a medium contained in the housing which expands under the action of heat so that upon applying heat to the medium the plunger is moved in a direction towards the grease reservoir, wherein the plunger is operatively connected to the grease reservoir; and an activatable electrical heating element positioned relative to the expansion element to apply the heat to the medium in the housing upon being activated to move the plunger in a direction towards the grease reservoir to deliver the grease to the antifriction bearing.

2. Device as claimed in claim 1, wherein the grease reservoir is formed as a cavity in the stator part.

3. Device as claimed in claim 2, wherein the cavity is cylindrically-shaped.

4. Device as claimed in claim 2, wherein the cavity extends essentially perpendicular to an axis of rotation of the rotor part.

5. Device as claimed in claim 1, wherein the grease reservoir is closed at one end by a movable piston.

6. Device as claimed in claim 5, wherein the piston is moved with the plunger.

7. Device as claimed in claim 6, further comprising a spring and a switch arranged between the plunger and the piston or between the housing and the stator, the spring and the switch being arranged such that upon activation of the heating element the spring is tensioned and the switch is actuated, and upon deactivation of the heating element spring relaxes and the switch is released.

8. Device as claimed in claim 7, wherein the switch and the heating element are connected to one another such that with actuation of the switch a definable activation time of the heating element is triggered.

9. Device as claimed in claim 1, wherein a portion of the plunger extends into the grease reservoir to deliver the grease to the antifriction bearing upon activation of the heating element.

10. Device as claimed in claim 9, further comprising a stop which the plunger contacts after the plunger moves a set amount.

11. Device as claimed in claim 9, wherein one end of the grease reservoir is closed by a movable piston, a portion of the plunger extending through the piston.

12. Device as claimed in claim 9, wherein the piston is elastically supported such that a cavity which forms after delivery of grease by a corresponding movement of the plunger and subsequent return motion of the plunger is eliminated so that no grease is thereafter delivered via the elastically supported piston.

13. Device as claimed in claim 1, further comprising a spring and/or a switch arranged between the plunger and the stator part.

14. Device as claimed in claim 1, further comprising a channel system between the grease reservoir and the antifriction bearing.

15. Device as claimed in claim 14, wherein the antifriction bearing comprises an outside ring formed with at least one lubricant opening which penetrates the outside ring essentially radially.

16. Device as claimed in claim 15, wherein one end of the channel system communicates with the lubricant opening.

17. Device as claimed in claim 1, wherein the antifriction bearing is a ball bearing.

18. Device as claimed in claim 1, wherein the expansion element and the heating element are integrated into the stator part.

19. Device as claimed in claim 1, wherein the device is a spindle unit of a machine tool.

20. Device comprising:
 a rotor part configured to rotate;
 a stator part stationarily positioned relative to the rotor part;
 at least one antifriction bearing positioned between the stator part and the rotor part;
 a grease reservoir in the stator part containing grease for lubrication of the antifriction bearing;
 a channel connecting the grease reservoir to the antifriction bearing;
 an expansion element operatively connected to the grease reservoir and comprised of a housing, a movable plunger positioned in the housing and having a portion extending outside the housing toward the grease reservoir, and a medium in the housing which expands under the action of heat to move the plunger in a direction towards the grease reservoir to force grease out of the grease reservoir; and
 an activatable electrical heating element positioned relative to the expansion element to apply the heat to the medium in the housing to expand the medium and cause the plunger to move towards the grease reservoir to deliver the grease in the grease reservoir to the antifriction bearing by way of the channel.

* * * * *